US006777835B1

(12) United States Patent
Sines

(10) Patent No.: US 6,777,835 B1
(45) Date of Patent: Aug. 17, 2004

(54) ELECTRICAL POWER COOLING TECHNIQUE

(75) Inventor: Eddie Sines, Manassas, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/364,256

(22) Filed: Jul. 30, 1999

Related U.S. Application Data

(62) Division of application No. 08/940,179, filed on Sep. 30, 1997, now Pat. No. 6,259,347.

(51) Int. Cl.[7] ............................ H02K 9/22; H02K 3/02; H02K 3/04

(52) U.S. Cl. ........................... 310/64; 310/52; 310/184; 310/190; 310/192; 310/195; 310/208; 310/65; 310/223; 310/54; 310/58; 310/59; 310/179

(58) Field of Search ................................. 310/192, 208, 310/180, 184, 195, 190, 64, 65, 52, 16, 223, 194, 54, 58, 59, 179

(56) References Cited

U.S. PATENT DOCUMENTS 422,863 A * 3/1890 Washburn ................... 310/265
3,123,747 A * 3/1964 Glass .......................... 310/65
3,671,787 A * 6/1972 Herron ........................ 310/154
3,965,378 A * 6/1976 Liebe et al. .................. 310/65
4,266,152 A * 5/1981 Herr et al. ............. 310/154.01
4,897,626 A * 1/1990 Fitter ......................... 336/175
5,091,666 A * 2/1992 Jarczynski ................... 310/54
5,949,170 A * 9/1999 Davis ......................... 310/208

FOREIGN PATENT DOCUMENTS

EP 462005 A1 * 12/1991 ............ H02K/9/22
JP 402290138 A * 11/1990
JP 411150899 A * 6/1999

* cited by examiner

*Primary Examiner*—Tran Nguyen
*Assistant Examiner*—J. Aguirrechea
(74) *Attorney, Agent, or Firm*—John J. Karasek; Sally Ferrett

(57) ABSTRACT

The apparatus for cooling a high power electrical transformer and electrical motors uses thermally conductive material interleaved between the turn layers of a high power transformer and iron core laminates to provide a low resistant thermal path to ambient. The strips direct excess heat from within the interior to protrusions outside of the windings (and core) where forced air or thermally conductive potting compound extracts the heat. This technique provides for a significant reduction of weight and volume along with a substantial increase in the power density while operating at a modest elevated temperature above ambient.

39 Claims, 5 Drawing Sheets

ELECTRICAL POWER COOLING TECHNIQUE

This application is a Divisional Application of the application having the Ser. No. 08/940,179 filed Sep. 30, 1997 now U.S. Pat. No. 6,259,347.

BACKGROUND OF THE INVENTION

1. Field of the Invention

This invention pertains generally to electrical power devices and more particularly to an apparatus for cooling electrical power devices.

2. Description of the Related Art

The power rating of present-day electrical devices, such as power transformers and motors, is limited by heat accumulation due to resistive losses in the copper windings and, in the case of power transformers, to losses from eddy currents and hysteresis within the iron or ferrite cores. It is not generally recognized that the magnetic flux within a transformer core remains approximately constant when the power output is increased. It is therefore unnecessary to increase the amount of iron or ferrite core material to increase the size of the transformer core in order to deliver more power. The trapped heat produced by the windings while operating at high power is the major limiting factor for high power transformers.

Different approaches have been attempted to try and remove heat from the core of power transformers. Some of these are the increasing of wire size to reduce resistive losses; immersion of the transformer in circulating coolant oil; air cooling of the transformer windings; increasing the operating frequency of the transformer to reduce windings; and increasing the thermal conductivity of the insulating potting compound around the transformer windings. All of these, however, impact on the mechanical size and weight of the transformer designs limiting the use of these applications. Without proper cooling the efficiency and reliability of these transformers and motors are considerably reduced.

SUMMARY OF THE INVENTION

The object of this invention is to provide an apparatus for cooling high power electrical devices.

Another object of this invention is to provide a cooler operating high power electrical device that is of light weight, low cost, higher power density, and highly efficient design.

These and other objectives are obtained by placing thermal conductive strips between the turn layers along the axis and perpendicular to the turns of an high power electrical device, such as a transformer or motor, which extends outside of the windings or between the laminates of the core. The excess heat is conducted outward from the interior of the device along the strips to the outside of the device's windings where it is extracted from the protrusions by means of a highly thermal-conductive potting compound that has a short thermal path to a small heat sink.

DESCRIPTION OF THE PREFERRED EMBODIMENT

Figure 1:
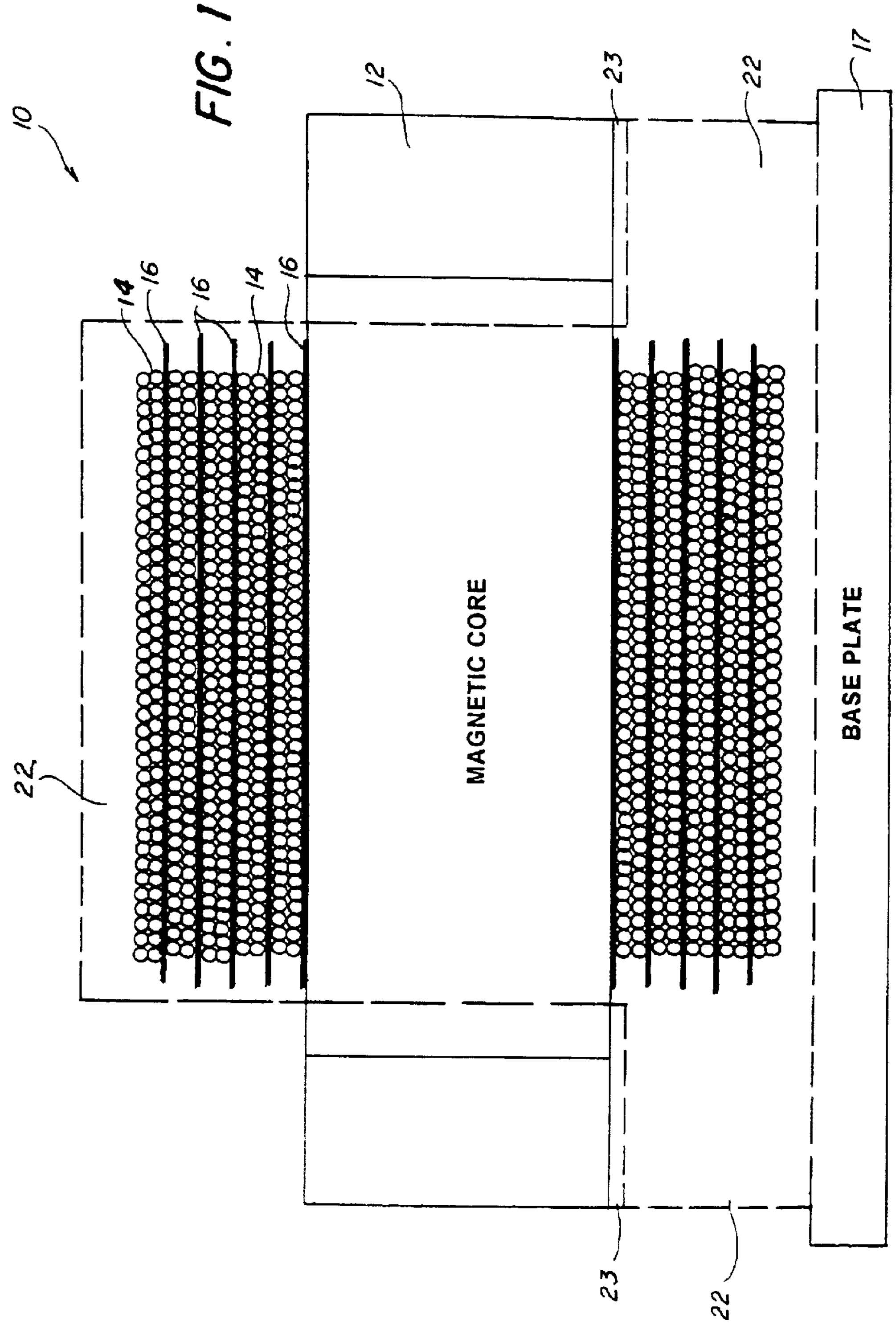
FIG. 1 shows a cutaway view of a transformer with a thermal conductive strip between layers of wire turns around the transformer core.

The apparatus for cooling a high power electrical device, such as a transformer 10, as shown in FIG. 1, comprised of various core materials such as laminated iron, ferrite, and other core materials known to those skilled in the art. The transformer core 12 is comprised of windings of electrical conducting material 14; preferably copper wire, preferably electrically insulated with a flexible, high dielectric material such as KAPTON® type 150FN019, manufactured by DuPont of Wilmington, Del., or similar material, wrapped around the transformer core 12. KAPTON® FN film is a DuPont KAPTON® HN film coated on one or both sides with a TEFLON® FEP (fluorinated ethylene propylene copolymer) fluorocarbon resin to impart heat sealability, to provide a moisture barrier and to enhance chemical resistance. The KAPTON® prevents electrical shorts between conductors and adjacent layers. Heat is dissipated from the transformer core 12 to ambient through a heat sink 17 such as a base plate.

A thermally conductive material, or strip, 16 placed in preselected locations between the windings of electrically conductive material 14, the ends of which protrude outside of the area covered by the conductive material 14. In the example shown in FIG. 1 of a completed transformer 10, the thermally conductive material 16 is inserted between every other layer of electrically conductive material 14. The thermally conductive strip 16, is preferably a high modulus carbon graphite laminate material, such as an Amoco type K1100X pitch fiber processed by Composite Optics of San Diego, Calif. The laminate of the conductive strip 16, is an ansotripic material that is highly efficient in conducting heat along the fiber orientation which is unidirectional. An alternative material for the thermally conductive strip 16 is copper or a ceramic, however these have not been found to be as efficient in conducting heat away from the center of a device, such as the transformer 10, as the high modulus carbon graphite laminate material.

The thermally conductive strip 16 normally has a smooth epoxy surface finish. To improve the thermal interface by as much as 10%, the strips 16 must be lightly scraped with a sharp instrument, such as a razor blade, to remove a small portion of the residual epoxy and fibers left over from the manufacturing process. After scraping, the strip 16 will appear dull with a graphite appearance.

Because the thermally conductive strip 16 normally will have sharp edges on the sides, a narrow glass tape (not shown), approximately 0.005 inches thick, 0.250 inches wide, and having a voltage breakdown of approximately 5 kV, such as 3M glass cloth tape No. 361, a pressure sensitive, 7.5 mil tape good to a temperature of 235° C., manufactured by 3M Electrical Products Division of Austin, Tex., is used to buffer the layers of the windings 14 from the thermally conductive strip 16 to prevent damage to the winding 14 coating thereby shorting out the transformer.

The glass tape (not shown) is placed on the edge of the thermally conductive strip 16 on both sides of the strip 16 and offset by one-half the tape width parallel to the strips 16.

In the art this technique is commonly referred to as "butterflying." The application of the glass tape (not shown) forms a wedge adjacent to the edge of the strip 16.

A thermally conductive grease, such as type 120-8, manufactured by Wakefield of Wakefield, Mass., is placed in the wedge formed by the tape (not shown) and the strip 16; a technique well known to those skilled in the art. The strip 16 is installed into the core 12 on top of the thermal grease and a second application of the thermal grease is used to cover the strip 16. The thermal grease is placed between the two layers of glass tape (not shown) and a second piece of glass tape (not shown) is placed over the first by starting at one edge and lowering the tape (not shown) to the strip 16. A light pressure is uses to encompass the two glass tapes (not shown) together and make contact with the strip 16 sealing the thermal grease inside of the structure. This is accomplished on both sides of the strip 16, as previously stated. Heat generated within the transformer by resistive losses in the windings of electrically conductive material 14 and due to eddy currents within the core 12 is conducted to the portions of the thermally conductive strip 16 protruding outside of the electrical windings of conductive 14 and in contact with the ferrite core or iron laminates 12.

Surrounding the transformer 10 is a high thermal-conductivity potting compound 22, such as STYCAST® 2850, or similar material. STYCAST® 2850 is a highly filled, castable epoxy system manufactured by Emerson & Cumming, Inc. of Lexington, Mass. Potting of the transformer core 12 is accomplished by placing the completed wound copper-core in a mold (not shown) in which potting compound 22 is molded around the transformer core 12 to provide a short thermal path to a base-plate main heat sink 17 where excess heat is dissipated to surround atmosphere. The mold (not shown) with the transformer 10 and potting compound 22 is placed into an evacuated chamber (not shown) until the potting compound 22 expands to the top of the mold (not shown) and cured for approximately two hours at approximately 100 degrees centigrade. The vacuum atmosphere within the chamber (not shown) further forces the thermally conductive epoxy (not shown) in and around the windings 14 of the completed copper core and the mold profile, thereby, further enhancing the heat dissipation of the strips 16. The vacuum is applied and released a number of times until the potting compound 22 stops expanding to insure that very little air remains within the windings 14 or mold assembly (not shown). This will eliminate core failures due to corona. Additional potting compound 22 may have to be added to the mold (not shown) so as to cover completely the windings 14 when done.

The potting compound 22 on a transformer 10 is extended to the outer edge of the transformer core 12 on the base plate side only. On the other side the potting compound 22 need extend only past the outer edges of the thermally conductive strip 16.

To prevent mechanical stresses on the transformer core 12 due to the expansion of the potting compound 22, the mold assembly should be designed so as to provide a "head space" or gap 23 between the potting compound 22 and the transformer core 12. In assembly this space is filled with a thermal heat sink strip , such as SIL-PAD® 2000, manufactured by Berquist of Minneapolis, Minn.

Alternatively, in place of the potting compound 22, the heat may be conducted from the ends of the thermally conductive strips 16 by the use of a fan (not shown), a technique that is well known to those skilled in the art.

Figure 2:
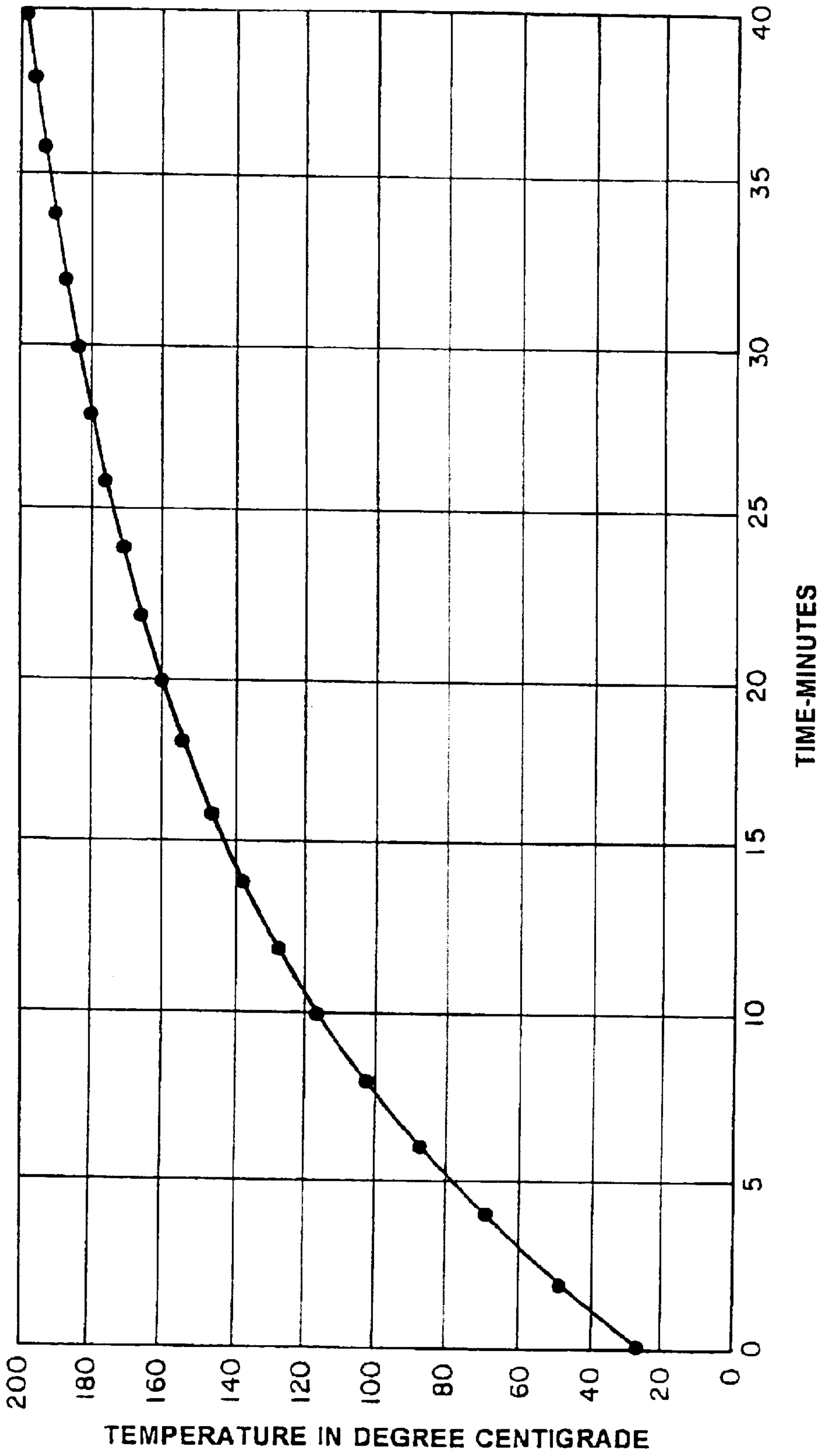
FIG. 2 PRIOR ART
FIG. 2 shows the temperature gradient for a transformer constructed utilizing current state-of-the-art techniques.

In a design of a test transformer, a 2 kva (2 kW) power transformer providing 1.2 lb/kW was constructed using modern state-of-the-art techniques well known to those skilled in the art. The design measures 3.02 inches by 3.17 inches by 2.22 inches, and weighed 2.4 pounds. In tests, the transformer constructed according to state-of-the-art techniques, after 40 minutes, showed a windings temperature of 200° C. at the center of the windings and suffered catastrophic failure due to excess heat (FIG. 2).

Figure 3:
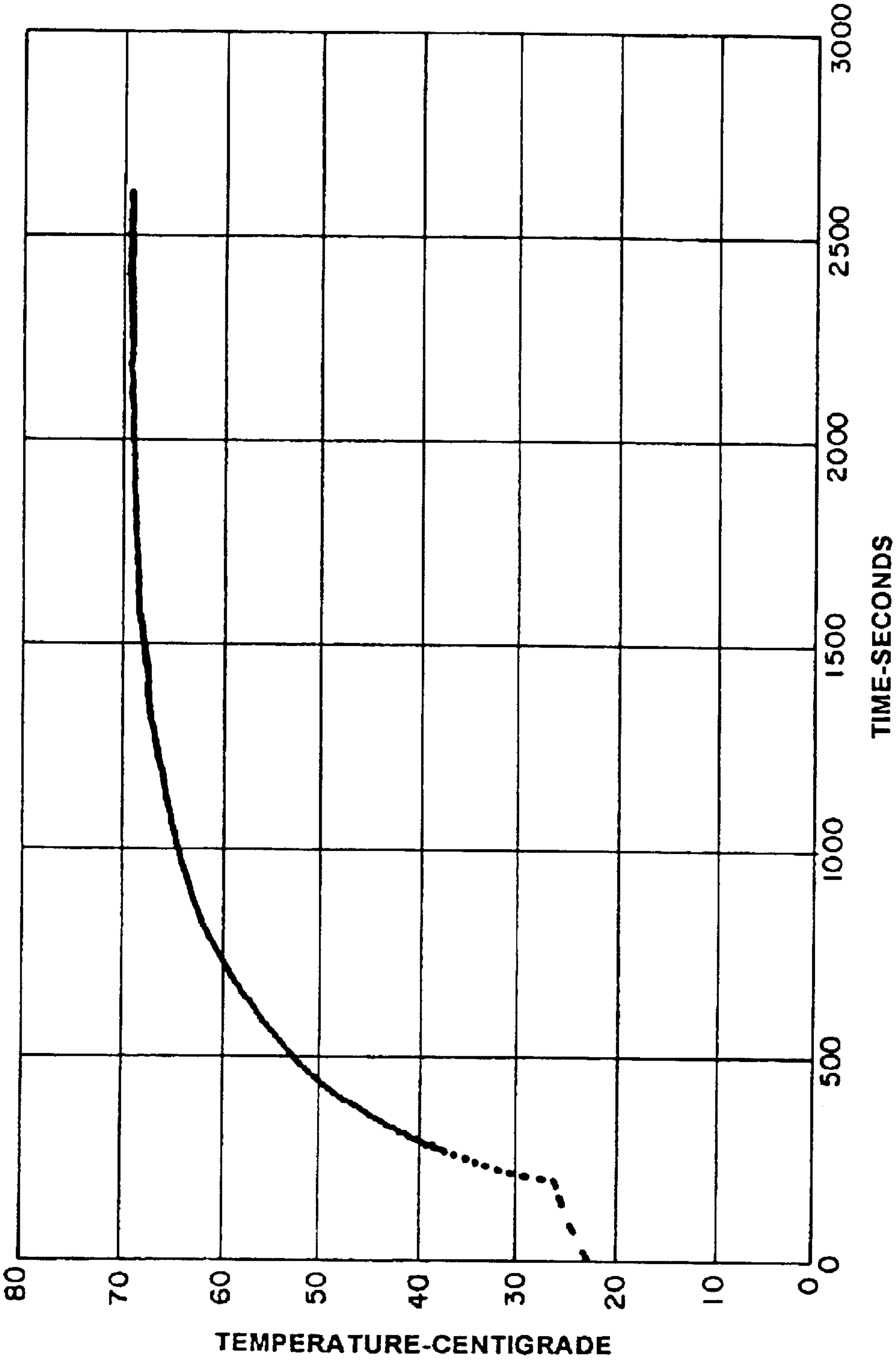
FIG. 3 shows the temperature gradient for a transformer constructed utilizing a thermal conductive strip technique.
Figure 4:
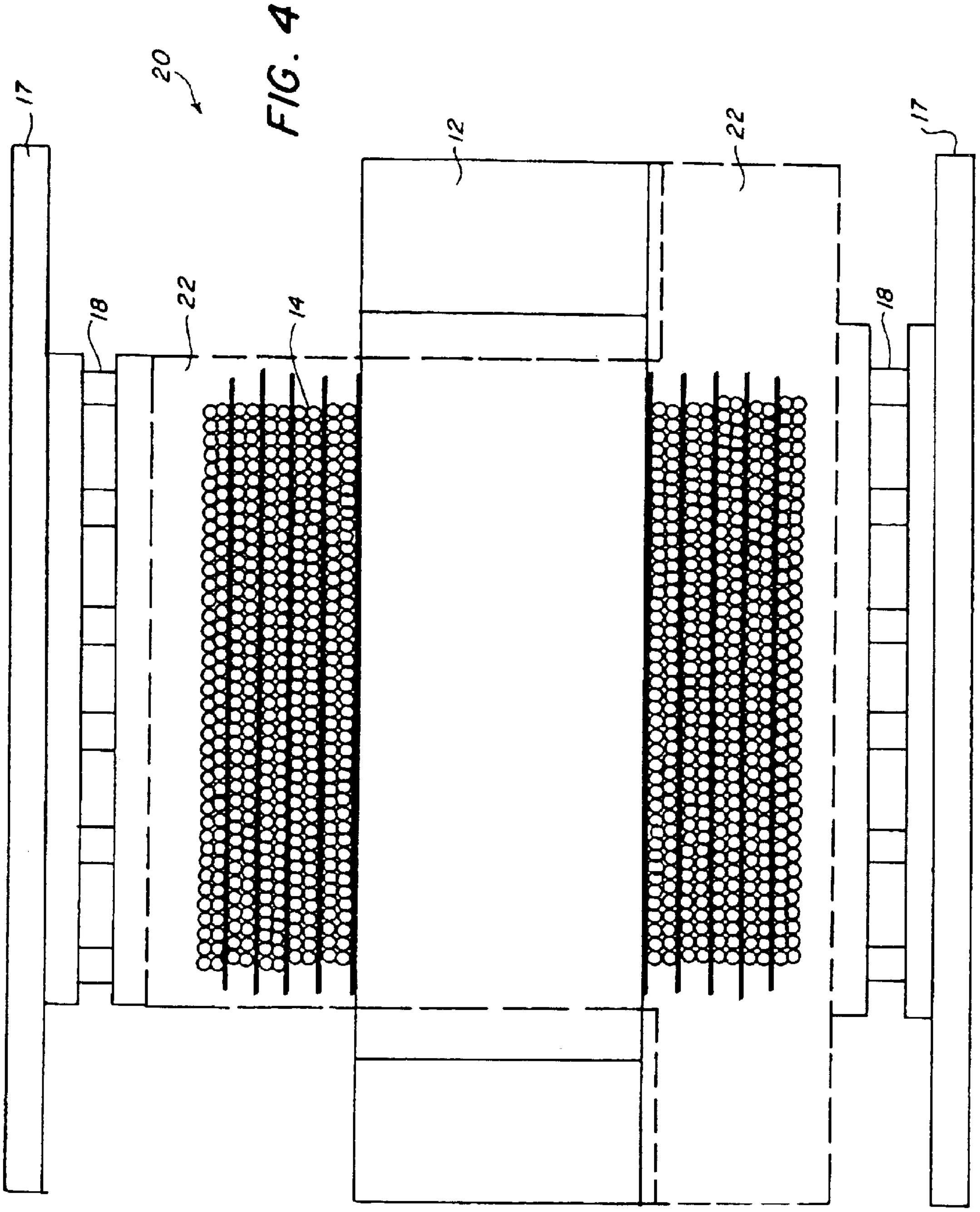
FIG. 4 shows a cutaway view of a transformer with a thermal conductive strip between layers of wire turns around the transformer core and a thermocooler.

A duplicate transformer 10 weighing approximately 0.21 lb/kW was constructed utilizing the technology set forth in this invention with the K1100 conductive strips 16 placed within the windings 14 of the transformer. The design measured 3.02 inches by 3.17 inches by 2.22 inches and weighed 2.4 pounds. In tests, the transformer 10 with the thermally conductive strips 16 placed alternately between windings (FIG. 1) showed, after approximately 40 minutes, a windings 14 temperature of approximately 70° C. without failure (FIG. 3).

This invention allows for the reduction in size of a high power transformers by a factor of 4 to 8 and a reduction in weight by a factor of 4 to 6, and an increase in power density by 5 to 10 in power. The efficiency of the transformer is improved by maximizing the heat transfer from the transformers interior and minimizing voltage breakdown. The thermal properties of each core 12 will dictate the quantity of thermally conductive strip 16 material required to lower the transformer temperature to a predetermined level, some testing may be required to established the optimal amount needed to provide proper cooling.

When additional cooling is required or to raise the power of a transformer 20, a thermocooler 18, such as model CP2-127-06-7 made by Melcon of Trenton, N.J., may applied to the outside of the transformer 20. The thermocooler 18, with or without a cooling fan (not shown). Control of the thermocooler 18 may be such that it could be turned on and off as cooling demands raise and lower. The thermocooler 18 may be attached to the outer portions of the transformer 20 where it could be easily removed for replacement, if required. In some instances it may be desirable to selective control the operation of the thermocooler 18, therefore a control device such as a timer (not shown) or thermal switch (not shown) may be integrated into the transformer 20 package to either increase the thermal conductivity or decrease it by switching the thermocooler on or off, as desired.

Although this embodiment has been described in relation to exemplary device such as a transformer, the claimed invention may equally well be utilized in other types of electrical devices where internal heat is a problem, such as motors, modulation transformers, etc. The size of the transformer is not of concern, it may vary from a small transformer used in switching power supplies to power transformers used in electrical distribution systems. Further, the frequency of the electrical current within the devices to be cooled is irrelevant, e.g., 60 cycles to 400 cycles operate the same thermally. High frequency transformers have higher copper losses due to skin effects. This additional heat may also be removed by the thermally conductive strip as set forth in this invention.

Figure 5A:
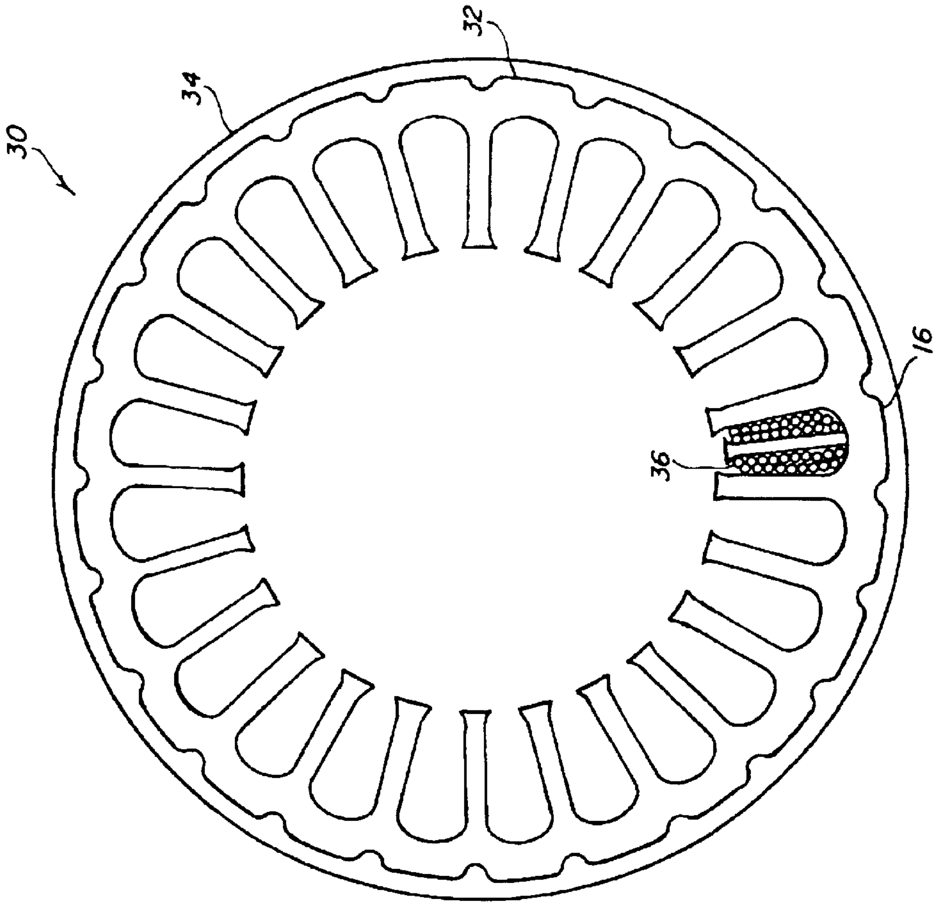
FIG. 5*a* shows an electric motor with a thermal conductive strip between windings of the motor.
Figure 5B:
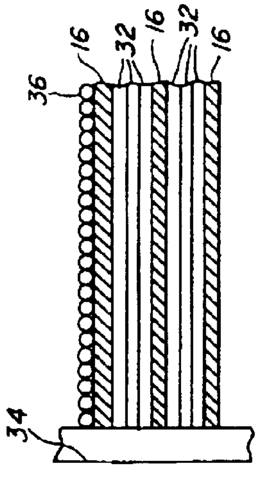
FIG. 5*b* shows a cutaway of a motors laminations with thermal conductive strips interleaved between laminations.

When applied to electrical motors 30, as shown in FIG. 5*a*, pieces of thermally conductive strip 16 are placed between windings of the motor 30 or interleaved into vertically stacked motor laminations 32, as shown in FIG. 5*b*. The internal heat from the motor laminations 32 and windings 36 is conducted from the interior of the motor 30 to the outer portions where the heat is then dissipated through the motor case 34 to ambient atmosphere.

Although the invention has been described in relation to the exemplary embodiment thereof, it will be understood by those skilled in the art that still other variations and modifications can be affected in the preferred embodiment without detracting from the scope and spirit of the invention as stated in the claims.

What is claimed is:

1. An electric motor comprising:

one or more laminations of a metallic material forming an outer casing of the electric motor;

one or more circular non-metallic, flat, thermally conductive disks positioned between said laminations for conducting heat generated by an electrical current flowing within the motor through said conductive disks;

an electrically conductive material wound in a plurality of layers within the laminations so as to form an electric field that drives an armature when an electrical current is applied, thermally conductive strips interleaved between preselected layers of the electrically conductive material, said thermally conductive strip extending outside of the area covered by the electrically conductive material; and means for conducting heat at the end of the non-metallic thermally conductive disk and the thermally conductive strips thereby cooling the motor.

2. An electric motor, as in claim 1, further comprising one or more thermocoolers adjacent to and touching the outer casing of the motor to conduct heat from the non-metallic thermally conductive strips and the metallic laminations forming the outer casing of the motor.

3. The electric motor of claim 1, wherein the circular, non-metallic, flat, thermally conductive disk has an anisotropic thermal conductivity.

4. The electric motor of claim 1, wherein the circular, non-metallic, flat, thermally conductive disk comprises a carbon-fiber composite.

5. The electric motor of claim 4, wherein the carbon-fiber composite conducts heat along the fibers of the carbon-fiber composite.

6. The electric motor of claim 1, wherein the circular, non-metallic, flat, thermally conductive disk comprises a high modulus carbon graphite laminate material.

7. The electrical motor of claim 1, wherein the means for removing heat includes a thermally conducting potting compound.

8. The electrical motor of claim 1, wherein the conductive disk is anisotropic.

9. A method for cooling electrical devices having layers of electrically conductive material wound on a core comprising the steps of:

placing a non-metallic thermally conductive strip having a first end and a second end, capable of conducting heat from between layers of the electrically conductive material, with said strip extending through at least some of the layers of electrically conductive material wound on the core with both said first end and said second end extending outside of an area covered by the layers of electrically conductive material; and conducting the heat from the layers of electrically conductive material through the first and second ends of the non metallic thermally conductive material thereby cooling said electrical device.

10. A method as in claim 9, further comprising the step of:

placing the non-metallic thermally conductive strip having a first and second end between a plurality of predetermined laminations of the core, said first and second ends of the non-metallic thermally conductive strip extending outside the core.

11. The method according to claim 9, wherein said step of placing a non-metallic thermally conductive strip comprises placing a high modulus carbon graphite laminate thermally conductive strip.

12. The method according to claim 9, wherein said step of placing a non-metallic thermally conductive strip comprises placing a carbon-fiber composite thermally conductive strip.

13. The method according to claim 9, wherein said step of placing a non-metallic thermally conductive strip comprises placing a non-metallic thermally conductive strip having an anisotropic thermal conductivity.

14. A method for cooling an electrical device having layers of electrically conductive material wound on to a laminated core having a heat generating component comprising the steps of:

placing one or more non-metallic, flat, thermally conductive strips in contact with the heat generating component across its entire length, said thermally conductive strip extending outside of the area covered by the electrically conductive material and core and in physical contact with the electrically conductive material, thereby receiving heat from the electrically conductive material, and removing heat from a first end and a second end of each of the thermally conductive strips.

15. The method according to claim 14, wherein said step of placing a non-metallic thermally conductive strip comprises placing a high modulus carbon graphite laminate thermally conductive strip.

16. The method according to claim 14, wherein the thermally conductive strip comprises a carbon-fiber composite.

17. The method according to claim 14, wherein said step of placing a non-metallic thermally conductive strip comprises placing a non-metallic thermally conductive strip having an anisotropic thermal conductivity.

18. A method for cooling an electrical device having layers of electrically conductive material wound onto a core and having a heat generating component, the method comprising:

placing one or more non-metallic, flat, thermally conductive strips having an anisotropic thermal conductivity in contact with the heat generating component across an entire length of the heat generating component, said thermally conductive strip extending outside of the area covered by the electrically conductive material and core and in physical contact with the electrically conductive material, thereby receiving heat from the electrically conductive material, and removing heat from a first end and a second end of each of the thermally conductive strips.

19. An electromagnetic device comprising:

a magnetic core;

at least one coil of electrically conductive material for conducting an electrical current therethrough, the coil having a plurality of turns;

at least one non-metallic, thermally conductive strip having anisotropic thermal conductivity, the strip positioned between adjacent turns of the coil for conducting heat generated in the coil away from the device.

20. The electromagnetic device of claim 19, wherein the at least one non-metallic, thermally conductive strip extends beyond a surface of the coil.

21. The electromagnetic device of claim 19, wherein the non-metallic, thermally conductive strip terminates at the surface of the coil or extends beyond a surface of the coil.

22. The electromagnetic device of claim 19, wherein the at least one non-metallic, thermally conductive strip is positioned between adjacent turns of the coil, at least one of the strips extending beyond a surface of the coil.

23. The electromagnetic device of claim 19, wherein the at least one non-metallic, thermally conductive strip extends beyond a surface of the coil transfers heat to surrounding air.

24. The electromagnetic device of claim 19, wherein the at least one non-metallic, thermally conductive strip extends beyond a surface of the coil transfers heat to a surrounding potting compound.

25. The electromagnetic device of claim 19, wherein the device is a motor.

26.The electromagnetic device of claim 19, wherein the device is a transformer.

27. The electromagnetic device of claim 19 further comprising an armature, wherein an electrical current in the coil forms an electromagnetic field that drives the armature when the electrical current is applied.

28. The electromagnetic device of claim 19, wherein the coil of electrically conductive material is wound on the magnetic core.

29. The electromagnetic device of claim 19, wherein the at least one non-metallic, thermally conductive strip comprises graphite.

30. The electromagnetic device of claim 19, wherein the at least one non-metallic thermally conductive strip comprises fibers having a highest thermal conductivity in a direction along the fibers.

31. The electromagnetic device of claim 19, wherein the non-metallic thermally conductive strip has a greater thermal conductivity than copper.

32. The electromagnetic device of claim 19, wherein the non-metallic thermally conductive strip has a thermal conductivity similar to copper or less than copper.

33. The electromagnetic device of claim 19, wherein the at least one non-metallic, thermally conductive strip includes a high modulus carbon graphite laminate.

34. The electromagnetic device of claim 19, wherein the at least one non-metallic, thermally conductive strip includes carbon graphite laminate.

35. The electromagnetic device of claim 19, wherein the non-metallic thermally conductive strip is flat.

36. The electromagnetic device of claim 19, wherein the non-metallic thermally conductive strips are non-magnetic.

37. The electromagnetic device of claim 19, wherein the non-metallic thermally conductive strip is not affected by Eddy currents.

38. The electromagnetic device of claim 19, wherein the non-metallic thermally conductive strip is less electrically conductive and more thermally conductive than aluminum.

39. The electromagnetic device of claim 19, further comprising a base plate heat sink, the non-metallic thermally conductive strips conducting heat from the coil to the base plate heat sink.

* * * * *